(12) United States Patent
Bortz et al.

(10) Patent No.: US 12,504,414 B1
(45) Date of Patent: Dec. 23, 2025

(54) WIRELESS-COMMUNICATION-ENABLED DISSOLUTION INSTRUMENT CALIBRATION SYSTEM

(71) Applicant: Quality Lab Accessories LLC, Telford, PA (US)

(72) Inventors: Michael Bortz, Allentown, PA (US); Robert J. Spock, Bridgewater, NJ (US)

( * ) Notice: Subject to any disclaimer, the term of this patent is extended or adjusted under 35 U.S.C. 154(b) by 452 days.

(21) Appl. No.: 17/979,217

(22) Filed: Nov. 2, 2022

Related U.S. Application Data (60) Provisional application No. 63/277,214, filed on Nov. 9, 2021.

(51) Int. Cl.
*G01N 33/15* (2006.01)
(52) U.S. Cl.
CPC .................... *G01N 33/15* (2013.01)
(58) Field of Classification Search
CPC .............. B01F 27/0725; B01F 27/2121; F16C 2316/10; F16C 3/023; G01N 13/00; G01N 2013/006
See application file for complete search history.

(56) References Cited

U.S. PATENT DOCUMENTS

| | | | |
|---|---|---|---|
| 6,155,113 A * | 12/2000 | Swon | G01M 1/16 73/462 |
| 6,546,821 B2 | 4/2003 | Duckett et al. | |
| 6,764,651 B2 | 7/2004 | Fernando et al. | |
| 6,962,674 B2 | 11/2005 | Dean et al. | |
| 9,243,891 B2 | 1/2016 | Bobasheva et al. | |
| 10,184,874 B2 | 1/2019 | Kalbermatten et al. | |
| 2007/0276612 A1 * | 11/2007 | Cheng | G01N 33/15 73/61.61 |
| 2012/0095723 A1 * | 4/2012 | Bobasheva | G01B 11/08 702/145 |
| 2012/0109567 A1 * | 5/2012 | Bobasheva | B01F 27/90 702/108 |

* cited by examiner

*Primary Examiner* — Kristina M Deherrera
*Assistant Examiner* — Gedeon M Kidanu
(74) *Attorney, Agent, or Firm* — Michael J. Feigin, Esq.; Feigin and Fridman LLC (57) ABSTRACT

A wireless-enabled dissolution instrument calibration system including a vessel module measuring a first set of data related to the calibration of dissolution instrument, an instrument module measuring a second set of data related to the calibration of the dissolution instrument, a data conversion module configured to receive the first and second set of data and convert the data into visual data on a report, and a wireless transceiver coupled to the vessel module, the instrument module, and the data conversion module. The wireless transceiver transmits the first and second set of data to the data conversion module automatically as the first and second set of data is measured. The data conversion module organizes the visual data on the report into spreadsheets and/or tables by the particular measurement and renders the visual data un-editable to safeguard compliance.

17 Claims, 5 Drawing Sheets

WIRELESS-COMMUNICATION-ENABLED DISSOLUTION INSTRUMENT CALIBRATION SYSTEM

FIELD OF THE DISCLOSED TECHNOLOGY

The disclosed technology relates to dissolution instrument calibration, and more specifically, to a bluetooth-enabled calibration system for high-integrity dissolution instrument calibration.

BACKGROUND OF THE DISCLOSED TECHNOLOGY

Dissolution testing is an important tool for characterizing the performance of oral solid dosage forms. Its significance is based on the fact that for a drug to be effective, it must first be released from the product and dissolved in the gastrointestinal fluids before absorption into the bloodstream can happen. In other words, the rate and extent of drug absorption are determined by its dissolution from the dosage form.

In order to achieve reliable data from dissolution tests, however, dissolution instruments require frequent calibration. Ideally, this calibration should be easy to perform and should quickly and conveniently produce high-integrity data. These and other problems are solved by embodiments of the disclosed technology, as described below.

SUMMARY OF DISCLOSED TECHNOLOGY

The present disclosed technology provides a wireless-communication-enabled dissolution instrument calibration system for use when calibrating a dissolution instrument including a vessel, a vessel plate, a shaft, a paddle, spindle, and a basket. The calibration system includes a vessel module sized and configured for insertion into the vessel of the dissolution instrument, the vessel module measuring a first plurality of data in the dissolution instrument including spindle speed, shaft wobble, basket wobble, shaft verticality, vessel verticality, relative verticality of the shaft and the vessel, vessel centering, basket height and paddle height measurements, an instrument module including for measuring a second plurality of data including vessel plate height, vessel plate levelness, and vessel plate vibration measurements, the instrument module including a tri-axial accelerometer to measure the vessel plate vibration in an X-axis, a Y-axis, and a Z-axis, a flat planar surface for mounting the instrument module flatly on the vessel plate, and a plurality of inputs and outputs for connecting the tri-axial accelerometer and one or more sensors for calculating the second plurality of data, a data conversion module configured to receive the first plurality of data and the second plurality of data and convert the data into un-editable visual data organized on a report, and a wireless transceiver coupled to the vessel module, instrument module, and the data conversion module, the wireless transceiver transmitting the first plurality of data and the second plurality of data to the data conversion module automatically as the first plurality of data and the second plurality of data is measured.

In some embodiments, the tri-axial accelerometer calculates the vessel plate vibration to generate a full measure of vibration experienced by the vessel plate and/or by an object disposed on the vessel plate.

In embodiments, the data conversion module includes a computer processor, a memory, and a logic, the computer processor configured to execute the logic, the logic when executed by the computer processor converts the first plurality of data and the second plurality of data into visual data and organizes the visual data on the report into spreadsheets and/or tables by the particular measurement and rendering the visual data un-editable to safeguard compliance.

In some embodiments, the logic further generates separate deviation measurement data and converts the deviation measurement data into visual data organized on the report, the logic generating the separate deviation measurement data by comparing measures of deviations of the first plurality of data and the second plurality of data with pre-existing standardized data.

In embodiments, the pre-existing standardized data includes data from the specifications of a specific dilution instrument being calibrated and/or data previously measured from the specific dilution instrument being calibrated.

In some embodiments, the report is compliant with Part 11 of Title 21 of the Code of Federal Regulations (21 CFR Part 11).

In embodiments, the wireless-communication-enabled dissolution instrument calibration system further includes a plurality of attachment tools selected from the group consisting of a gauge with digital readout, a digital level, a setting gauge, a height measurement adapter, a centering measurement adapter, a wobble adapter, a calibrated shaft, a depth gauge, a tachometer, a thermometer, a pH meter, a dissolved Oxygen meter, an Oxygen/° C. meter, a timer, digital protractor, a vessel centering gauge, a vibration meter, a verticality meter, and a wobble meter.

In other embodiments, the wireless-communication-enabled dissolution instrument calibration system further includes a plurality of attachment tools including a thermometer, a depth setting gauge, a digital depth gauge, a tachometer, a digital level, a vessel centering gauge, a vibration meter, a verticality meter, and a wobble meter.

In embodiments, the wireless-communication-enabled dissolution instrument further includes a carrying case for the vessel module, the instrument module, and the plurality of attachment tools, the carrying case sized and configured to accommodate the vessel module, instrument module, and the plurality of attachment tools such that each of the modules and attachment tools is substantially immobile therein.

In some embodiments, the carrying case includes a foam layer having cutouts each sized to receive an attachment tool therein.

In embodiments, the wireless transceiver is a Bluetooth transceiver, which communicates wirelessly over ultra-high frequency (UHF) radio waves in the ISM radio bands from 2.402 GHz to 2.48 GHz.

The present disclosed technology also provided a method of calibrating a dissolution instrument using the wireless-communication-enabled dissolution instrument calibration system. The method includes placing the vessel module within the vessel and around the shaft of the dissolution instrument to obtain the first plurality of data, placing the flat planar surface of the instrument module on the vessel plate of the dissolution instrument to obtain the second plurality of data, attaching at least one of a plurality of attachment tools selected from the group consisting of a gauge with digital readout, a digital level, a setting gauge, a height measurement adapter, a centering measurement adapter, a wobble adapter, a calibrated shaft, a depth gauge, a tachometer, a thermometer, a pH meter, a dissolved Oxygen meter, an Oxygen/° C. meter, a timer, digital protractor, a vessel centering gauge, a vibration meter, a verticality meter, and a wobble meter to the dissolution instrument to aid in the acquisition of the first plurality of data and the second plurality of data, operating the system to obtain the first plurality of data and second plurality of data, transmitting the data wirelessly to the data conversion module over the wireless transceiver, automatically converting the first plurality of data and the second plurality of data to visual data via the data conversion module, automatically organizing the visual data on an un-editable report via the data conversion module In embodiments, the method further includes calculating the vessel plate vibration using the tri-axial accelerometer to generate a full measure of vibration experienced by the vessel plate or by an object disposed on the vessel plate.

In some embodiments, the data conversion module includes a computer processor, a memory, and a logic, the computer processor executing the logic, the logic when executed by the computer processor converting the first plurality of data and the second plurality of data into visual data and then subsequently organizing the visual data on the report into spreadsheets or tables by the particular measurement and rendering the visual data un-editable to safeguard compliance.

In embodiments, the logic further generates separate deviation measurement data and converts the deviation measurement data into visual data organized on the report, the logic generating the separate deviation measurement data by comparing measures of deviations of the first plurality of data and the second plurality of data with pre-existing standardized data.

In some embodiments, the pre-existing standardized data includes data from the specifications of a specific dilution instrument being calibrated and/or data previously measured from the specific dilution instrument being calibrated.

In embodiments, a Bluetooth calibration system of embodiments of the disclosed technology includes two tool modules, a vessel module and an instrument module, and a plurality of attachments for use therewith.

In some embodiments, the vessel module and its attachments are capable of measuring various aspects of a dissolution machine apparatus, including: spindle speed (measured in RPM); shaft and basket wobble; shaft and vessel verticality (both individually and relative one to another); vessel centering (upper and lower); and basket and paddle height.

In other embodiments, the instrument module and its attachments are capable of measuring further various aspects of a dissolution machine apparatus, including: vessel plate height and levelness; and vessel plate vibration. Vibration, in some embodiments, is measured with a tri-axial accelerometer, such that vibration is measured in an X-axis, a Y-axis, and a Z-axis. Resultant and/or experienced vibration may then be calculated by squaring vibrations detected in each axis and by then taking a square root of a sum thereof where "resultant vibration" is defined as "a full measure of vibration experienced by a plate and/or by an object placed thereon".

In embodiments, the calibration system further includes a computer program which receives data sent by the two modules and the plurality of attachments via a Bluetooth connection between the two modules and/or the plurality of attachments and a device on which the computer program is stored. The computer program accepts the data and generates a high-integrity report thereof. A "high-integrity report" is defined as "a report whose contents cannot be altered by normal use of a system or application on which the report is displayed".

In some embodiments, the computer program receives data by way of a hard-wired connection to the two modules and/or to the plurality of attachments in addition to and/or in place of the bluetooth connection.

In embodiments, the system further includes a carrying case for the modules and/or the plurality of attachments. The carrying case is sized to accommodate the modules and/or the plurality of attachments such that each module and/or attachment is substantially immobile therein, such as by way of being placed within cutouts in a foam layer.

In some embodiments, the system includes a plurality of hand tools, each of which is capable of transmitting data via a Bluetooth connection. The hand tools are capable of measuring, either alone or in concert, data regarding aspects of a dissolution machine apparatus, including: spindle speed (measured in RPM); shaft and basket wobble; shaft and vessel verticality (both individually and relative one to another); vessel centering (upper and lower); basket and paddle height; vessel plate height and levelness; and vessel plate vibration. Vibration may be measured as described above.

In further embodiments, the computer program generates a report further including measure of deviations of measured data from pre-existing data, such as data from specifications of a machine being calibrated and/or data previously measured from a machine being calibrated.

"Dissolution" refers to "the process where a solute in gaseous, liquid, or solid phase dissolves in a solvent to form a solution." A "dissolution instrument" refers to "an apparatus, device, or machine that determines the rate of dissolution of a dosage form to evaluate the performance of the dosage form". "Calibration" refers to "the comparison of measurement values delivered by an instrument, device, apparatus, or machine 'under test with those of a calibration standard of known accuracy." "Un-editable" refers to "data or text that is not capable of being manipulated or altered." "Report" refers to "a document or file including visual data."

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DESCRIPTION OF EMBODIMENTS OF THE DISCLOSED TECHNOLOGY

Referring now to FIGS. 1-5, simultaneously, the present disclosed technology provides a wireless-communicationenabled dissolution instrument calibration system 10 and a method of calibrating a dissolution instrument 100 including a vessel 105, a vessel plate 110, a shaft 115, a paddle 120, spindle 125, and a basket 130 using the calibration system 10. The system 10 includes a vessel module 15, an instrument module 20 for determining calibration data of the dissolution instrument 100, a wireless transceiver 25 for communicating the data, and a data conversion module 30 for converting the calibration data into visual data, generating a report including the visual data, and organizing the calibration data on the report.

The vessel module 15 is sized and configured for insertion into the vessel 105 of the dissolution instrument 100. The vessel module 15 measures and acquires a first plurality of data in the dissolution instrument 100 including spindle speed, shaft wobble, basket wobble, shaft verticality, vessel verticality, relative verticality of the shaft and the vessel, vessel centering, basket height and paddle height measurements.

The instrument module 20 measures a second plurality of data including vessel plate height, vessel plate levelness, and vessel plate vibration measurements. The instrument module 20 comprises a tri-axial accelerometer for measuring the vessel plate vibration in an X-axis, a Y-axis, and a Z-axis, a flat planar surface 21 for mounting the instrument module 20 flatly on the vessel plate 110, and a plurality of inputs and output ports 22 for connecting the tri-axial accelerometer and one or more sensors for calculating the second plurality of data. The tri-axial accelerometer calculates the vessel plate vibration to generate a full measure of vibration experienced by the vessel plate and/or by an object disposed on the vessel plate.

Figure 1:
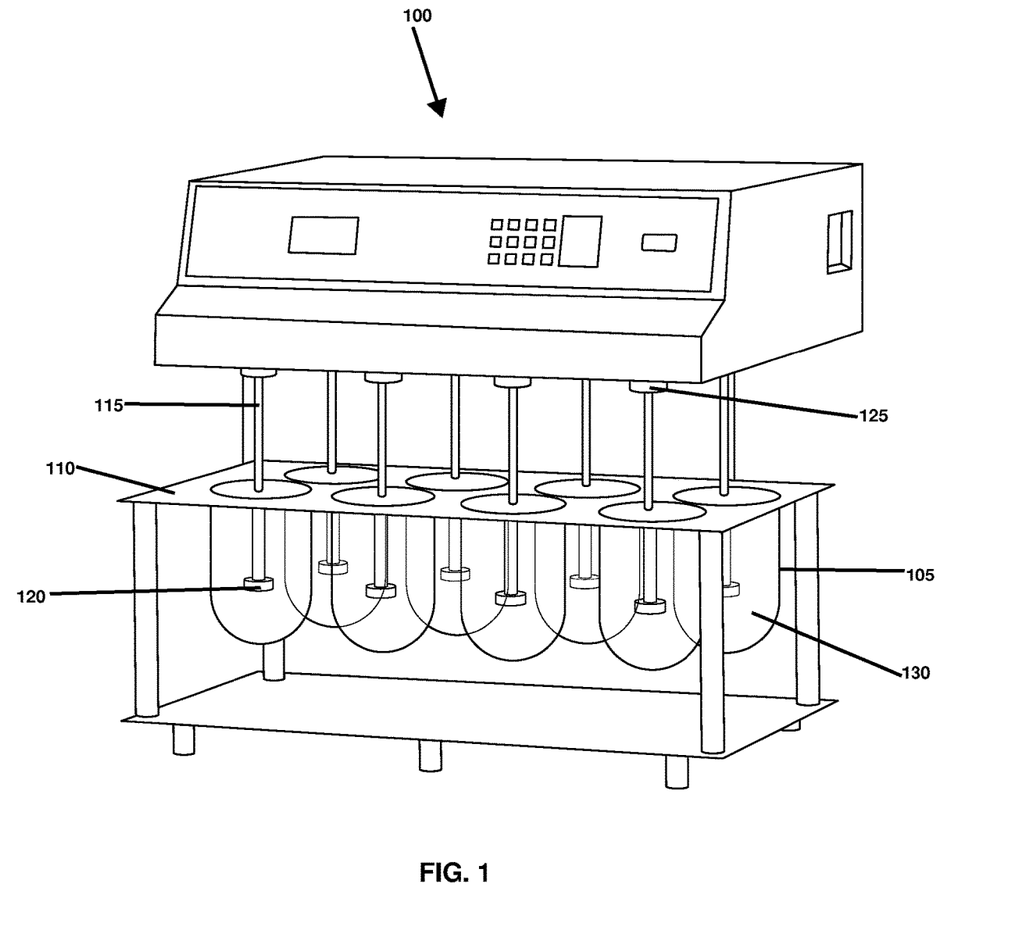
FIG. 1 shows a dissolution instrument, which the wireless-communication-enabled calibration instrument may calibrate according to one embodiment of the present disclosed technology.
Figure 2:
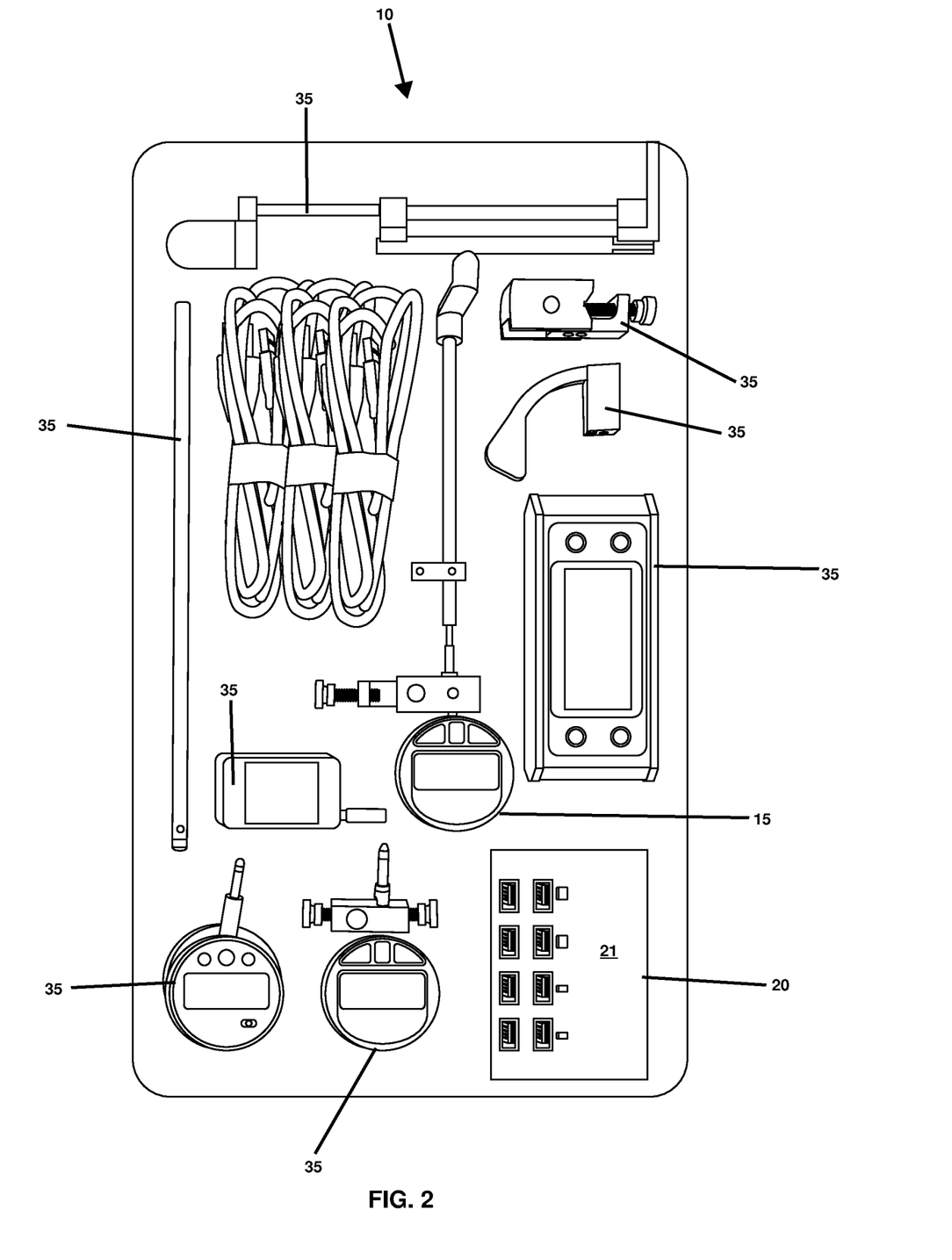
FIG. 2 shows a view of the wireless-communication-enabled calibration instrument according to one embodiment of the present disclosed technology.
Figure 3:
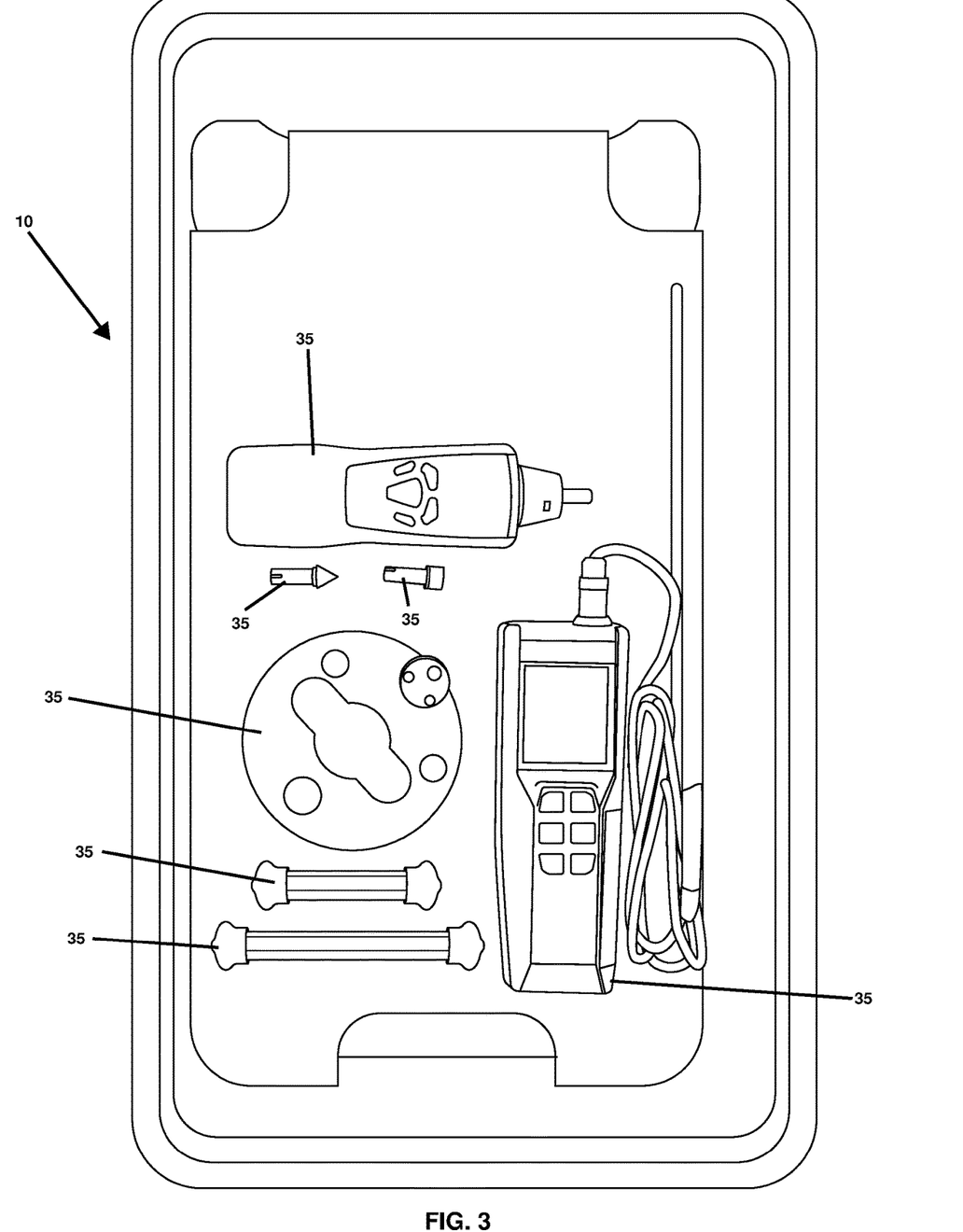
FIG. 3 shows another view of the wireless-communication-enabled calibration instrument according to one embodiment of the present disclosed technology.
Figure 4:
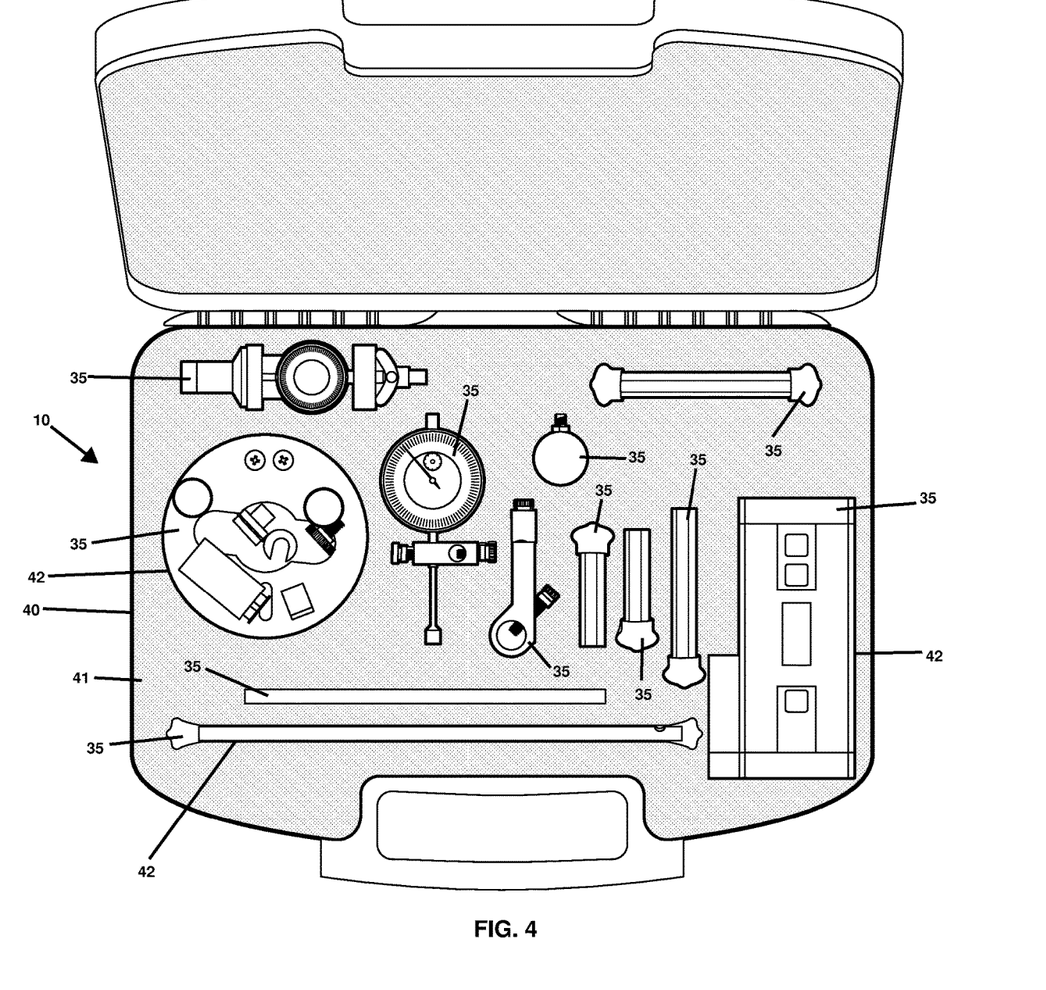
FIG. 4 yet another view of the wireless-communication-enabled calibration instrument according to one embodiment of the present disclosed technology.
Figure 5:
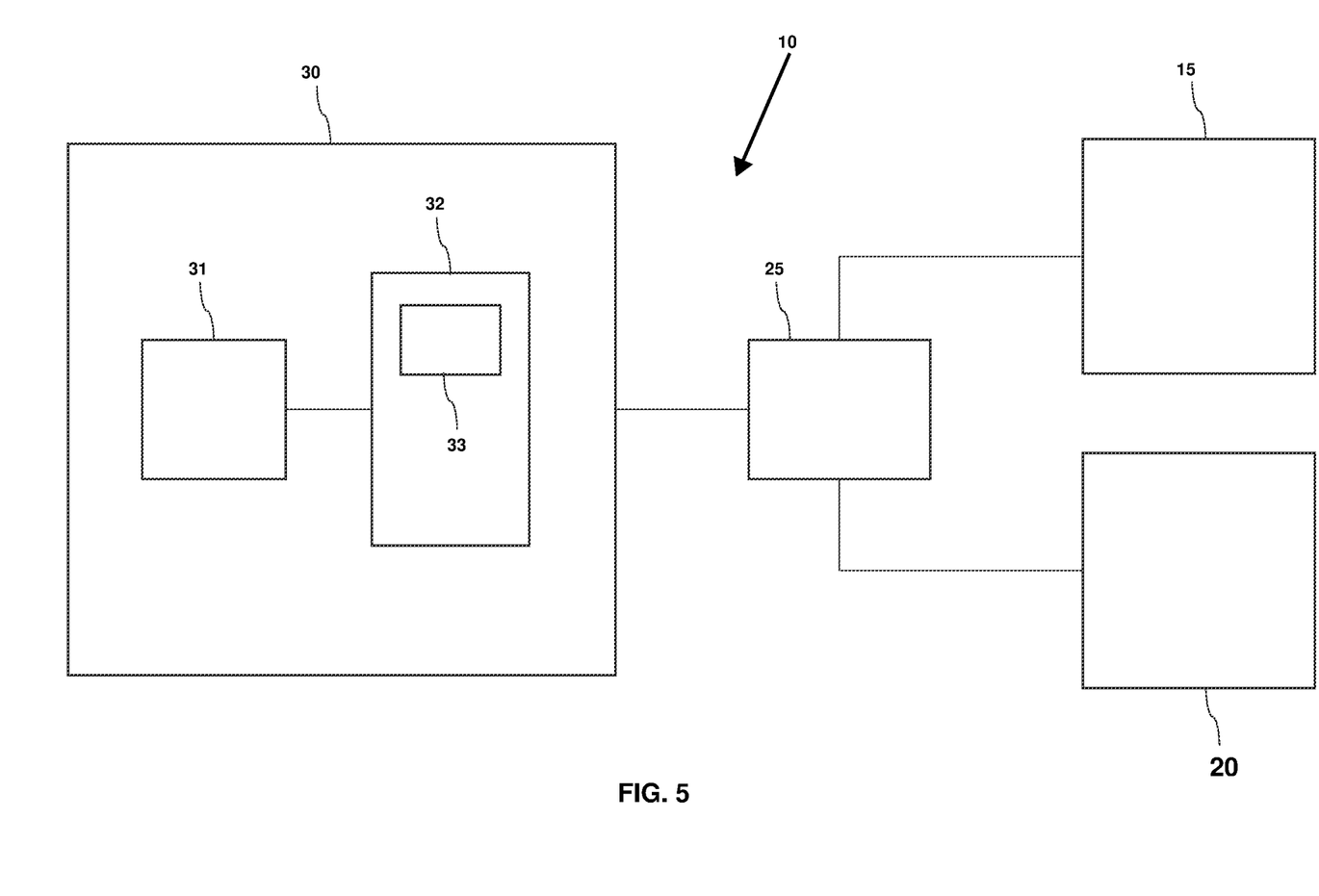
FIG. 5 shows a schematic view of the wireless-communication-enabled calibration instrument according to one embodiment of the present disclosed technology.

The data conversion module 30 is configured to receive the first plurality of data and the second plurality of data and convert the first and second plurality of data into visual data, such as visual text. The data conversion module 30 is further configured to generate a report including the visual data and organize the visual data on the report. The data conversion module 30 is further configured to render the visual data of the report un-editable or in an un-editable file format, for example, by not being capable of manipulation or alteration by users, by means of encryption or any other text-editing prevention means. The data conversion module 30 comprises a computer processor 31, a memory 32, and a logic 33 stored on the memory 32. The logic 33 is non-transitory computable-readable media. The computer processor 31 is configured to execute the logic 33, such that the logic 33 when executed by the computer processor 31 performs a series of steps or instructions, in which the logic 33 converts the first plurality of data and the second plurality of data into the visual data, generates the report including the visual data, organizes the visual data on the report into spreadsheets and/or tables by the particular measurement, and renders the visual data un-editable, as discussed above, to safeguard compliance in accordance with Part 11 of Title 21 of the Code of Federal Regulations (21 CFR Part 11).

In embodiments, the logic 33 further generates separate deviation measurement data and converts the deviation measurement data into visual data organized on the report. The logic 33 generates the separate deviation measurement data by comparing measures of deviations of the first plurality of data and the second plurality of data with pre-existing standardized data. The pre-existing standardized data may include data from the specifications of a specific dilution instrument being calibrated and/or data previously measured from the specific dilution instrument being calibrated.

The wireless transceiver 25 is coupled to the vessel module 15, instrument module 20, and the data conversion module 30. The wireless transceiver 25 receives the first plurality of data and the second plurality of data from the vessel module 15 and the instrument module 20 and transmits the first plurality of data and the second plurality of data to the data conversion module 30 automatically as the first plurality of data and the second plurality of data is measured by the vessel module 15 and the instrument module 20. The wireless transceiver may include a Bluetooth transceiver for communicating wirelessly over ultra-high frequency (UHF) radio waves in the ISM radio bands from 2.402 GHz to 2.48 GHz.

In embodiments, the calibration system 10 further comprises a plurality of attachment tools 35 selected from the group consisting of a gauge with digital readout, a digital level, a setting gauge, a height measurement adapter, a centering measurement adapter, a wobble adapter, a calibrated shaft, a depth gauge, a tachometer, a thermometer, a pH meter, a dissolved Oxygen meter, an Oxygen/° C. meter, a timer, digital protractor, a vessel centering gauge, a vibration meter, a verticality meter, and a wobble meter. In other embodiments, the calibration system 10 further comprises a plurality of attachment tools 35 including a thermometer, a depth setting gauge, a digital depth gauge, a tachometer, a digital level, a vessel centering gauge, a vibration meter, a verticality meter, and a wobble meter.

In some embodiments, the calibration system 10 further includes a carrying case 40 for the vessel module 15, the instrument module 20, and the plurality of attachment tools 35. The carrying case 40 is sized and configured to accommodate the vessel module 15, instrument module 20, and the plurality of attachment tools 35 such that each of modules 15, 20 and the attachment tools 35 are substantially immobile therein. For example, the carrying case 40 may include a foam layer 41 having cutouts 42 each sized to receive the modules 15, 20, and the attachment tools 35 therein.

The method of calibrating the dissolution instrument 100 using the wireless-communication-enabled dissolution instrument calibration system 10 of the present disclosed technology includes placing the vessel module 15 within the vessel 105 and around the shaft 115 of the dissolution instrument 100 to obtain the first plurality of data, placing the flat planar surface 21 of the instrument module 20 on the vessel plate 110 of the dissolution instrument 100 to obtain the second plurality of data, attaching at least one of the plurality of attachment tools 35 selected from the group consisting of a gauge with digital readout, a digital level, a setting gauge, a height measurement adapter, a centering measurement adapter, a wobble adapter, a calibrated shaft, a depth gauge, a tachometer, a thermometer, a pH meter, a dissolved Oxygen meter, an Oxygen/° C. meter, a timer, digital protractor, a vessel centering gauge, a vibration meter, a verticality meter, and a wobble meter to the dissolution instrument 100 to aid in the acquisition of the first plurality of data and the second plurality of data, operating the calibration system 10 to obtain the first plurality of data and second plurality of data, transmitting the data wirelessly to the data conversion module 30 over the wireless transceiver 25, automatically converting the first plurality of data and the second plurality of data to visual data via the data conversion module 30, and automatically organizing the visual data on an un-editable report via the data conversion module 30.

In embodiments, the method further comprises calculating the vessel plate vibration using the tri-axial accelerometer to generate a full measure of vibration experienced by the vessel plate or by an object disposed on the vessel plate.

In some embodiments, the method includes executing the logic 33 with the computer processor 31 to convert the first plurality of data and the second plurality of data into the visual data, organizing the visual data on the report into spreadsheets or tables by the particular measurement, and rendering the visual data in an un-editable format to safeguard compliance in accordance with Part 11 of Title 21 of the Code of Federal Regulations. The method may further include executing the logic 33 with the computer processor 31 to generate separate deviation measurement data and convert the deviation measurement data into visual data organized on the report. In some embodiments, the logic 33 generates the separate deviation measurement data by comparing measures of deviations of the first plurality of data and the second plurality of data with the pre-existing standardized data.

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and/or "within a tolerance level known in the art and/or within 5% thereof. Any device or aspect of a device or method described herein can be read as "comprising" or "consisting" thereof.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

What is claimed is:

1. A wireless-communication-enabled dissolution instrument calibration system for use when calibrating a dissolution instrument including a vessel, a vessel plate, a shaft, a paddle, spindle, and a basket, comprising:
   a vessel module sized and configured for insertion into the interior of the vessel of the dissolution instrument, the vessel module measuring a first plurality of data in the dissolution instrument including spindle speed, shaft wobble, basket wobble, shaft verticality, vessel verticality, relative verticality of the shaft and the vessel, vessel centering, basket height and paddle height measurements;
   an instrument module, separate from the vessel module, for measuring a second plurality of data including vessel plate height, vessel plate levelness, and vessel plate vibration measurements, the instrument module including a tri-axial accelerometer to measure the vessel plate vibration in an X-axis, a Y-axis, and a Z-axis, a flat planar surface for mounting the instrument module flatly on the vessel plate, and a plurality of input ports and of output ports for connecting the tri-axial accelerometer and one or more sensors for calculating the second plurality of data;
   a data conversion module configured to receive the first plurality of data and the second plurality of data and convert the data into un-editable visual data organized on a report;
   and a wireless transceiver coupled to the vessel module, the instrument module, and the data conversion module, the wireless transceiver transmitting the first plurality of data and the second plurality of data to the data conversion module automatically an in real-time as the first plurality of data and the second plurality of data is measured.

2. The wireless-communication-enabled dissolution instrument calibration system of claim 1, wherein the tri-axial accelerometer calculates the vessel plate vibration to generate a full measure of vibration experienced by the vessel plate and/or by an object disposed on the vessel plate.

3. The wireless-communication-enabled dissolution instrument calibration system of claim 1, wherein the data conversion module comprises a computer processor, a memory, and a logic stored on the memory, the computer processor configured to execute the logic, the logic when executed by the computer processor converts the first plurality of data and the second plurality of data into visual data and organizes the visual data on the report into spreadsheets and/or tables by the particular measurement and rendering the visual data un-editable to safeguard compliance.

4. The wireless-communication-enabled dissolution instrument calibration system of claim 3, wherein the logic further generates separate deviation measurement data and converts the deviation measurement data into visual data organized on the report, the logic generating the separate deviation measurement data by comparing measures of deviations of the first plurality of data and the second plurality of data with pre-existing standardized data.

5. The wireless-communication-enabled dissolution instrument calibration system of claim 4, wherein the pre-existing standardized data includes data from the specifications of a specific dilution instrument being calibrated and/or data previously measured from the specific dilution instrument being calibrated.

6. The wireless-communication-enabled dissolution instrument calibration system of claim 3, wherein the report is compliant with Part 11 of Title 21 of the Code of Federal Regulations.

7. The wireless-communication-enabled dissolution instrument calibration system of claim 6, wherein the system further comprises a plurality of attachment tools, each of the plurality of attachment tools can be selectably attached to, or detached from, one of the input ports or of the output ports, the plurality of attachment tools being selected from the group consisting of a gauge with digital readout, a digital level, a setting gauge, a height measurement adapter, a centering measurement adapter, a wobble adapter, a calibrated shaft, a depth gauge, a tachometer, a thermometer, a pH meter, a dissolved Oxygen meter, an Oxygen/° C. meter, a timer, digital protractor, a vessel centering gauge, a vibration meter, a verticality meter, and a wobble meter.

8. The wireless-communication-enabled dissolution instrument calibration system of claim 7, wherein the system further includes a carrying case for the vessel module, the instrument module, and the plurality of attachment tools, the carrying case sized and configured to accommodate the vessel module, instrument module, and the plurality of attachment tools such that each of the modules and attachment tools are substantially immobile therein.

9. The wireless-communication-enabled dissolution instrument calibration system of claim 7, wherein one of the plurality of attachment tools comprises a dissolved Oxygen meter, an Oxygen/° C. meter.

10. The wireless-communication-enabled dissolution instrument calibration system of claim 6, wherein the system further comprises a plurality of attachment tools, each of the plurality of attachment tools can be selectably attached to, or detached from, one of the input ports or of the output ports, the plurality of attachment tools including a thermometer, a depth setting gauge, a digital depth gauge, a tachometer, a digital level, a vessel centering gauge, a vibration meter, a verticality meter, and a wobble meter.

11. The wireless-communication-enabled dissolution instrument calibration system of claim 8, wherein the carrying case includes a foam layer having cutouts each sized to receive an attachment tool therein.

12. The wireless-communication-enabled dissolution instrument calibration system of claim 3, wherein the wireless transceiver is a Bluetooth transceiver communicating wirelessly over ultra-high frequency (UHF) radio waves in the ISM radio bands from 2.402 GHz to 2.48 GHZ.

13. A method of calibrating a dissolution instrument using the wireless-communication-enabled dissolution instrument calibration system of claim 1, comprising:
    placing the vessel module within the interior of the vessel and around the shaft of the dissolution instrument to obtain the first plurality of data;
    placing the flat planar surface of the instrument module on the vessel plate of the dissolution instrument to obtain the second plurality of data;
    attaching to one of the plurality of input ports or one of the plurality of output ports of the instrument module at least one of a plurality of attachment tools selected from the group consisting of a gauge with digital readout, a digital level, a setting gauge, a height measurement adapter, a centering measurement adapter, a wobble adapter, a calibrated shaft, a depth gauge, a tachometer, a thermometer, a pH meter, a dissolved Oxygen meter, an Oxygen/° C. meter, a timer, digital protractor, a vessel centering gauge, a vibration meter, a verticality meter, and a wobble meter to aid in the acquisition of the first plurality of data and the second plurality of data;
    operating the system to obtain the first plurality of data and second plurality of data;
    transmitting the data wirelessly to the data conversion module over the wireless transceiver;
    automatically converting the first plurality of data and the second plurality of data to visual data via the data conversion module;
    automatically organizing the visual data on an un-editable report via the data conversion module.

14. The method of claim 13, further comprising calculating the vessel plate vibration using the tri-axial accelerometer to generate a full measure of vibration experienced by the vessel plate or by an object disposed on the vessel plate.

15. The method of claim 13, wherein the data conversion module comprises a computer processor, a memory, and a logic stored on the memory, the computer processor executing the logic, the logic when executed by the computer processor converting the first plurality of data and the second plurality of data into visual data and then subsequently organizing the visual data on the report into spreadsheets or tables by the particular measurement and rendering the visual data un-editable to safeguard compliance.

16. The method of claim 15, wherein the logic further generates separate deviation measurement data and converts the deviation measurement data into visual data organized on the report, the logic generating the separate deviation measurement data by comparing measures of deviations of the first plurality of data and the second plurality of data with pre-existing standardized data.

17. The method of claim 16, wherein the pre-existing standardized data includes data from the specifications of a specific dilution instrument being calibrated and/or data previously measured from the specific dilution instrument being calibrated.

* * * * *